United States Patent [19]

Niihara et al.

[11] Patent Number: 4,889,834

[45] Date of Patent: Dec. 26, 1989

[54] SIC-AL$_2$O$_3$ COMPOSITE SINTERED BODIES AND METHOD OF PRODUCING THE SAME

[75] Inventors: Koichi Niihara; Atsushi Nakahira, both of Yokosuka, Japan

[73] Assignee: NGK Insulators, Ltd., Nagoya, Japan

[21] Appl. No.: 246,799

[22] Filed: Sep. 20, 1988

[30] Foreign Application Priority Data

Sep. 30, 1987 [JP] Japan .................................. 62-244159

[51] Int. Cl.$^4$ ........................ C04B 35/10; C04B 35/56
[52] U.S. Cl. ........................................ 501/89; 501/128
[58] Field of Search ........................... 501/89, 127, 128

[56] References Cited

U.S. PATENT DOCUMENTS

| | | | |
|---|---|---|---|
| 3,538,205 | 11/1970 | Gates et al. | 501/89 X |
| 3,671,275 | 6/1972 | Gates et al. | 501/89 |
| 4,745,091 | 5/1988 | Landingham | 501/89 X |

FOREIGN PATENT DOCUMENTS

| | | | |
|---|---|---|---|
| 0039766 | 3/1984 | Japan | 501/89 |
| 1021964 | 1/1986 | Japan | 501/89 |
| 1021965 | 1/1986 | Japan | 501/89 |

Primary Examiner—William R. Dixon, Jr.
Assistant Examiner—Karl Group
Attorney, Agent, or Firm—Arnold, White & Durkee

[57] ABSTRACT

SiC-Al$_2$O$_3$ composite sintered bodies having high strength and toughness are constructed by dispersing SiC particles essentially inside individual of Al$_2$O$_3$ grains constituting a material.

1 Claim, 2 Drawing Sheets

FIG_2
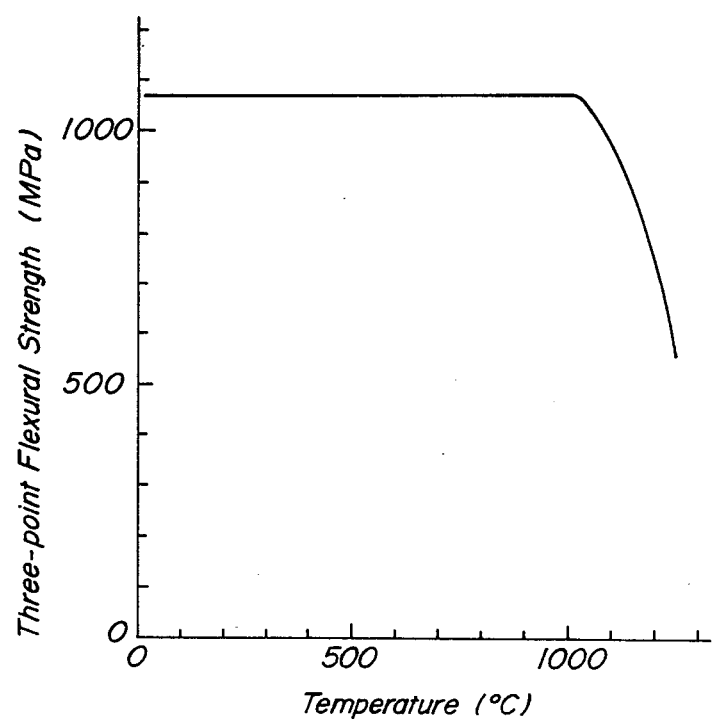

SIC-AL$_2$O$_3$ COMPOSITE SINTERED BODIES AND METHOD OF PRODUCING THE SAME

BACKGROUND OF THE INVENTION

1. Field of the Invention

This invention relates to SiC-Al$_2$O$_3$ composite sintered bodies and a method of producing the same, and more particularly to SiC-Al$_2$O$_3$ composite sintered bodies suitable for use in structural materials having high strength and toughness and a method of producing the same.

2. Related Art Statement

Al$_2$O$_3$ is widely used as a substrate or a package for integrated circuit, a chip for cutting tools or a refractory material. However, the strength and toughness of Al$_2$O$_3$ are low as compared with those of a silicon nitride sintered body, so that there is a restriction in its use as a structural material for engine parts and the like.

The strength and toughness of Al$_2$O$_3$ can be increased by dispersing SiC particles or SiC whiskers into the Al$_2$O$_3$. For example, the increase of the toughness in the Al$_2$O$_3$ sintered body through the dispersion of SiC whisker is disclosed in American Ceramic Society Bulletin, 64 [2], 298–304 (1985). Furthermore, Japanese Patent laid open No. 59-3,766 discloses the increase of the toughness in the Al$_2$O$_3$ sintered body having an entangled microstructure of SiC and Al$_2$O$_3$ and high strength and toughness. In the microstructure of these sintered bodies, SiC is liable to be a continuous phase, so that when the sintered body is heated in air, the oxidation of SiC is violent and the strength lowers, and the use of the sintered body can not be used at high temperatures for a long time.

Furthermore, the increase of the strength, toughness and hardness in the Al$_2$O$_3$ sintered body through the dispersion of SiC particles is disclosed in Japanese Patent laid open No. 61-21,964 and No. 61-174,165. In these sintered bodies, however, SiC particles are mainly existent at the grain boundary of Al$_2$O$_3$ grains constituting as a matrix, so that sufficient increase of the strength or toughness can not be attained in the Al$_2$O$_3$ sintered body causing intergranular breakage during the breaking.

SUMMARY OF THE INVENTION

It is, therefore, an object of the present invention to solve the aforementioned drawbacks of the conventional techniques and provide SiC-Al$_2$O$_3$ composite sintered bodies, in which the strength and toughness are sufficiently increased through the dispersion enhancement of SiC grains by dispersing SiC grains essentially inside individual Al$_2$O$_3$ grains constituting a matrix even in the case of the Al$_2$O$_3$ sintered body causing the intergranular breakage during the breaking, and a method of producing the same. It is another object of the invention to provide SiC-Al$_2$O$_3$ composite sintered bodies, in which SiC grains are exist inside the individual Al$_2$O$_3$ grains constituting a matrix and the oxidation resistance is good and the use at high temperature is possible for a long time, and a method of producing the same.

According to a first aspect of the invention, there is the provision of an SiC-Al$_2$O$_3$ composite sintered body, characterized in that SiC grains are dispersed in essentially inside the individual Al$_2$O$_3$ grains constituting a matrix.

According to a second aspect of the invention, there is provided a method of producing SiC-Al$_2$O$_3$ composite sintered bodies, which comprises forming a mixed powder comprising not less than 2 mol % of SiC particles having a particle size of not more than 0.5 $\mu$m and the remainder being Al$_2$O$_3$ powder having a particle size of not more than 0.5 $\mu$m and then sintering it at 1,400°–1,800° C.

BRIEF DESCRIPTION OF THE DRAWINGS

The invention will be described with reference to the accompanying drawings, wherein:

FIG. 2 is a graph showing a temperature change of strength in Example 1 of the SiC-Al$_2$O$_3$ composite sintered body according to the invention.

DESCRIPTION OF THE PREFERRED EMBODIMENTS

Figure 1:
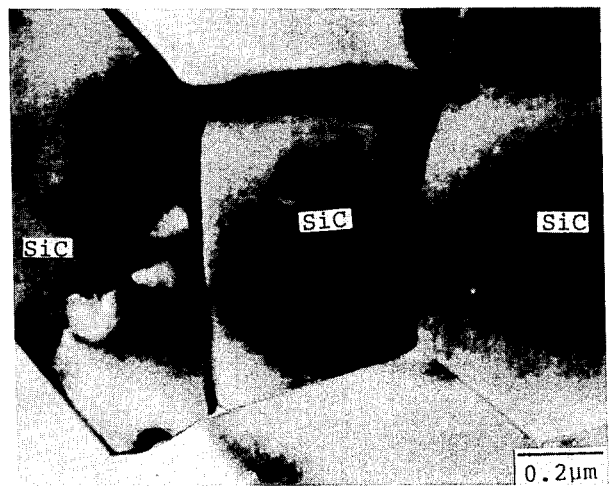
FIG. 1 is a microphotograph showing a micro structure of SiC-Al$_2$O$_3$ composite sintered body according to the present invention.

The SiC-Al$_2$O$_3$ composite sintered body according to the invention will be described in detail below. In FIG. 1 is shown an example of results observed by a transmission type electron microscope in the SiC-Al$_2$O$_3$ composite sintered body according to the invention. It is apparent from FIG. 1 that the SiC-Al$_2$O$_3$ composite sintered body according to the invention is constructed by dispersing SiC grains essentially inside individual Al$_2$O$_3$ grains constituting a matrix. The grains sizes of the SiC grains and Al$_2$O$_3$ grains are measured by means of a transmission type electron microscope or a scanning type electron microscope. According to the invention, it is preferable that the SiC grains to be dispersed have a grain size of not more than 0.5 $\mu$m and the $\alpha$-Al$_2$O$_3$ grains constituting a matrix has a particle size of not more than 5 $\mu$m. In the SiC-Al$_2$O$_3$ composite sintered body according to the invention, the crack growth in the Al$_2$O$_3$ grains of the Al$_2$O$_3$ sintered body causing the intergranular breakage during the breaking is prevented by SiC grains, and thus, the strength is increased. Furthermore, the sintered body is constructed by fine SiC grains and Al$_2$O$_3$ grains, so that the SiC grains or Al$_2$O$_3$ grains do not form a breakage generating source and the sintered body exhibits high strength. Since the effect of preventing the crack growth throughout the Al$_2$O$_3$ grains is sufficiently attained by the SiC grains, it is preferred that the sintered body contain not less than 2 mol % of SiC grains.

Further, the SiC grains exist essentially inside the individual Al$_2$O$_3$ grains constituting a matrix, so that it tightly protects the SiC grains and the oxidation resistance is excellent. Particularly, in order to allocate the isolated SiC grains inside the individual Al$_2$O$_3$ grains constituting a matrix, the sintered body is favorable to contain not more than 10 mol % of SiC grains. Since the SiC-Al$_2$O$_3$ composite sintered body according to the invention is excellent in the oxidation resistance, it may be heat-annealed in air to remove the surface defects such as poor shaping, working and the like, and to further increase the strength.

The production of the SiC-Al$_2$O$_3$ composite sintered body according to the invention will be described in detail below. The particle sizes of the SiC particles and Al$_2$O$_3$ powder as starting material are measured by a transmission type electron microscope. The Al$_2$O$_3$ grains of the Al$_2$O$_3$ sintered body grow during the sintering and encapsulate SiC grains therein, so that they have a sufficiently small grain size as the starting powder and should be grown in the sintering. Particularly, the particle size is important to be not more than 0.5 μm. On the other hand, the SiC particles are encapsulated in the grown $Al_2O_3$ grains during sintering, so that they are necessary to be fine and important to be not more than 0.5 μm. Moreover, the particle size of the SiC particle is preferable to be not more than 0.2 μm.

As the starting $Al_2O_3$ powder, γ-$Al_2O_3$ or the like may be used if it is converted to α-$Al_2O_3$ after the sintering. The SiC particles may have α type or β type. The $Al_2O_3$ powder and SiC particles are preferable to have a high purity because the impurities particularly degrade the high temperature properties. Preferably, the SiC particle is favorable to contain a metal impurity of not more than 1% and an oxygen content of not more than 1%.

The above $Al_2O_3$ powder and SiC particles are mixed to obtain a mixed powder for shaping. The mixing is carried out under wet or dry type by means of a ball mill or the like. The resulting mixed powder is shaped into a desired form by dry pressing, injection molding or the like.

The shaped body made from the mixed powder of $Al_2O_3$ powder and SiC particles is densified by pressureless sintering, hot pressing, hot isostatic pressing (HIP) or the like. In this case, it is necessary to set the firing conditions so that α-$Al_2O_3$ grains are only grown to encapsulate the SiC grains therein and the growth of α-$Al_2O_3$ grains is not excessive. For this purpose, the firing temperature is 1,400–1,800° C. When the firing temperature is lower than 1,400° C., the densification is insufficient and the particles do not grow, while when it is higher than 1,800° C., the growth of $Al_2O_3$ grains and SiC grains is excessive and the SiC-$Al_2O_3$ composite sintered body obtained by dispersing fine SiC grains into fine $Al_2O_3$ grains according to the invention can not be obtained. Furthermore, it is necessary to consider that the growth of $Al_2O_3$ grains is suppressed by the addition of SiC grains.

The firing atmosphere may be an inert atmosphere such as nitrogen, argon or the like, or a reducing atmosphere such as hydrogen or the like for preventing the oxidation of the SiC grains. As the hot isostatic pressing, there may be performed a method wherein a presintered body having less open porosity is previously produced by pressureless pressing or hot pressing, and then subjected to hot isostatic pressing, or a method wherein the shaped body is airtightly sealed with a metal, glass or the like and then subjected to hot isostatic pressing.

The following examples are given in illustration of the invention and are not intended as limitations thereof.

α-$Al_2O_3$ powder having a particle size shown in the following Table 1 and a purity of not less than 99% and β-SiC particles having an average particle size of 0.2 μm and a purity of 98% were mixed at a mixing ratio as shown in Table 1 in a polyethylene container containing iron balls, each coated with polyethylene, under a wet state of acetone for 10 hours. The thus obtained mixed powder was previously shaped into a size of 50 mm in diameter and 10 mm in thickness and pressed under a pressure of 200 MPa. The shaped body was then hot pressed at a temperature shown in Table 1 under a pressure of 30 MPa to obtain SiC-$Al_2O_3$ composite sintered bodies of Examples 1–8 according to the invention and Comparative Examples 9–12. All of these sintered bodies had a porosity of not more than 1% and were dense. In Examples 1–8 and Comparative Examples 9–12, the composition of the sintered body was coincident with that of the mixed powder as a result of crystal quantification through chemical analysis and X-ray diffraction. A transmission type electron microphotograph of the sintered body in Example 3 is shown in FIG. 1. The grain sizes of the $Al_2O_3$ grains and SiC grains and the position of SiC grain in Examples 1–8 and Comparative Examples 9–12 were measured by transmission type electron microscope and a scanning type electron microscope to obtain the results as shown in Table 1.

Furthermore, in Examples 1–8 and Comparative Examples 9–12, the three-point flexural strength at room temperature was measured according to a method of JIS R1601 and the fracture toughness value ($K_{IC}$) was measured according to an indentation fracture method to obtain results as shown in Table 1. Moreover, FIG. 2 shows the temperature change of three-point flexural strength in the sintered body of Example 3 when this strength was measured over a temperature range of from room temperature to 1,400° C. And also, the test specimens of Examples 1–8 were heated in air at 1,200° C. for 100 hours and the three-point flexural strength at 1,000° C. thereof was measured to obtain the results shown in Table 1.

TABLE 1

| | No. | Particle size of powder (μm) α-$Al_2O_3$ | Composition of mixed powder (mol %) α-$Al_2O_3$ | Composition of mixed powder (mol %) SiC particle | Firing temperature (°C.) | Existing state of SiC grain | Grain size of sintered body (μm) α-$Al_2O_3$ | Grain size of sintered body (μm) SiC grain | Three-point flexural strength (MPa) | $K_{IC}$ (MPam$^{0.5}$) | Three-point flexural strength after oxidation (MPa) |
|---|---|---|---|---|---|---|---|---|---|---|---|
| Example | 1 | 0.1 | 98 | 2 | 1600 | inside $Al_2O_3$ grain | <3 | <0.5 | 820 | 5.1 | 1200 |
| | 2 | 0.1 | 98 | 2 | 1800 | inside $Al_2O_3$ grain | <5 | <0.5 | 1020 | 5.7 | 1320 |
| | 3 | 0.2 | 95 | 5 | 1700 | inside $Al_2O_3$ grain | <3 | <0.5 | 1060 | 5.7 | 1560 |
| | 4 | 0.2 | 95 | 5 | 1800 | inside $Al_2O_3$ grain | <4 | <0.5 | 1040 | 5.9 | 1250 |
| | 5 | 0.2 | 90 | 10 | 1400 | inside $Al_2O_3$ grain | <3 | <0.5 | 960 | 5.4 | 950 |
| | 6 | 0.2 | 85 | 15 | 1700 | inside $Al_2O_3$ grain | <3 | <0.5 | 880 | 5.7 | 980 |
| | 7 | 0.5 | 90 | 10 | 1800 | inside $Al_2O_3$ grain | <4 | <0.5 | 900 | 5.9 | 1210 |
| | 8 | 0.5 | 85 | 15 | 1400 | inside $Al_2O_3$ grain | <3 | <0.5 | 850 | 5.0 | 1090 |
| Comparative Example | 9 | 0.5 | 95 | 5 | 1300 | grain boundary of $Al_2O_3$ | <0.8 | <0.5 | 550 | 4.5 | — |
| | 10 | 0.5 | 90 | 10 | 1900 | inside $Al_2O_3$ grains | <15 | <0.8 | 350 | 4.6 | — |
| | 11 | 1 | 95 | 5 | 1500 | grain boundary of $Al_2O_3$ | <7 | <0.5 | 480 | 4.2 | — |
| | 12 | 1 | 90 | 10 | 1600 | grain boundary of $Al_2O_3$ | <3 | <0.5 | 520 | 4.2 | — |

As seen from the above results, the SiC-$Al_2O_3$ composite sintered bodies according to the invention have a three-point flexural strength of not less than 850 MPa and a toughness ($K_{IC}$) of not less than 5.0 MPam$^{0.5}$, which are higher than those of the comparative examples. The bodies are also excellent in the high temperature properties up to 1,000° C. and good in the oxidation resistance. Furthermore, there is a case of increasing strength by the effect of removing surface defects through heating.

As mentioned above, the SiC-Al$_2$O$_3$ composite sintered bodies according to the invention have a strength of not less than 850MPa and $K_{IC}$ of not less than 5.0 MPam$^{0.5}$ through the dispersing reinforcement of SiC grains by dispersing SiC grains essentially inside individual Al$_2$O$_3$ grains constituting a matrix even in the Al$_2$O$_3$ sintered body causing the intergranular breakage during the breaking and thus, the bodies are suitable as a structural material having high strength and toughness. Furthermore, they are applicable to a high-temperature structural material such as engine parts or the like; because they are excellent in the high temperature properties up to 1,000° C. and good in the oxidation resistance owing to the individual presence of SiC grains inside the Al$_2$O$_3$ grains constituting a matrix and can be used at high temperature for a long period of time.

What is claimed is:

1. An SiC-Al$_2$O$_3$ composite sintered body, consisting essentially of:
   a matrix of Al$_2$O$_3$ grains, said grains having a grain size of not greater than 5 μm; and
   2–10 mol % SiC grains dispersed essentially inside individual Al$_2$O$_3$ grains, said SiC grains having a grain size of not greater than 0.5μm;
   wherein said composite sintered body has a $K_{IC}$ of not less than 5.0 MPam$^{0.5}$.

* * * * *